United States Patent [19]

Ross et al.

[11] 4,162,493

[45] Jul. 24, 1979

[54] GRAPHIC DISPLAY SYSTEMS

[75] Inventors: John Ross, Claremont; Amedeo F. Sala-Spini, Morley, both of Australia

[73] Assignee: Random Electronics International Pty. Limited, New South Wales, Australia

[21] Appl. No.: 757,734

[22] Filed: Jan. 7, 1977

[30] Foreign Application Priority Data

Jan. 13, 1976 [AU] Australia .............................. 4507/76

[51] Int. Cl.$^2$ ............................ G06F 3/14; G09F 9/00

[52] U.S. Cl. ...................................... 340/752; 340/755; 340/760; 340/792; 340/819

[58] Field of Search .............. 340/324 R, 324 M, 336, 340/24, 168 S

[56] References Cited

U.S. PATENT DOCUMENTS

| | | | |
|---|---|---|---|
| 3,555,505 | 1/1971 | Srogi | 340/24 |
| 3,846,784 | 11/1974 | Sinclar | 340/336 |
| 3,958,235 | 5/1976 | Duffy | 340/336 |
| 3,999,179 | 12/1976 | Prame | 340/336 |

*Primary Examiner*—Marshall M. Curtis
*Attorney, Agent, or Firm*—Murray & Whisenhunt

[57] ABSTRACT

A graphic display system in which the lights of an array of lights arranged in dot matrix form are illuminated to produce the illusion of a moving sign displaying letters, words, numbers etc. in which use is made of the phenomenon of beta apparent motion to enable a moving image of a high resolution to be produced with the use of a small proportion for example $\frac{1}{8}$, of the number of individual lights that would normally be considered necessary. The lights are preferably arranged in columns, lights in consecutive columns being illuminated in turn in the direction of apparent movement of the image.

20 Claims, 7 Drawing Figures

GRAPHIC DISPLAY SYSTEMS

Figures 1, 2:
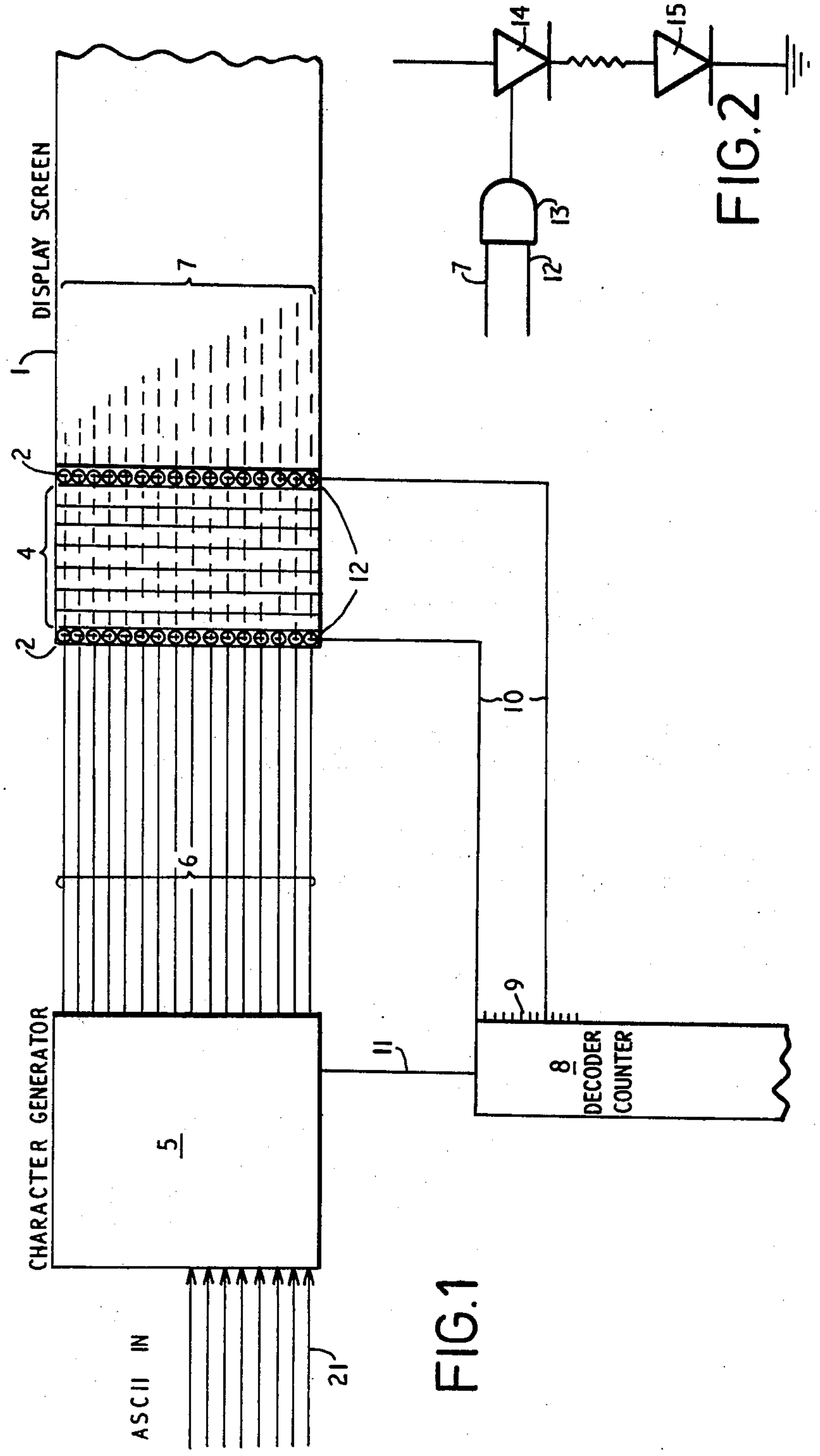

This invention relates to graphic display systems. The term graphic is used in this specification to include letters, words, numbers, idiographs, singly or in combination, symbols and artwork, in black and white or in colour, made up of elements arranged in dot matrix form. The invention has particular applicability to displays in public places, carrying information, advertising and the like, but it is also applicable to a wide range of types of displays, of all sizes, for private as well as public purposes.

All current display techniques including public signs, semaphores and television, are based on the theoretical assumption, not usually made explicit, that vision requires that an image formed on the eye of the observer at some instant, or over a brief interval of time, copies all the picture elements from the display in their proper positional relationships. It has hitherto been believed that higher perceptual processes require such an image to be formed so that the observer may be enabled to see the display. For this reason all current display methods attempt to present an observer with picture elements in their appropriate positions on a two-dimensional display surface, all at the same time or within a brief interval of time, so that the eye may acquire an image which captures and preserves the spatial arrangement of the picture elements. It has therefore been regarded as necessary to pack the two-dimensional display surface with sources for picture elements (lights or equivalent means) at a density both horizontal and vertical corresponding to the grain of the picture. If, for example, the letter T is to be displayed, it is regarded as necessary to have sufficient display sources in the vertical direction to exhibit the vertical component, and sufficient display sources in the horizontal direction to carry the horizontal component. To carry a full alphabet of letters and other characters, it is therefore regarded as necessary to provide a matrix of display sources, arranged in rows and columns to carry contours of all kinds, and to fill out forms of different shapes.

In fine grained display systems, such as television, the set of sources for picture elements is the set of positions on a phosphor surface at which an electron gun may be aimed, usually 512×512 positions, or more or less depending on local standards. In more coarse grained systems, there are fewer positions at which picture elements may be displayed, the cost being lower resolution or coarser grain. Current visual display systems intended to convey messages typically have low picture source density and are accordingly low in resolution and restricted in the characters and symbols they can display.

This discussion has so far been restricted to stationary images, as opposed to this there are those visual display systems which deal with moving graphics.

When graphics which appear to move smoothly across the surface of the display are to be displayed, the method used by all current techniques is to display the complete graphic many times in a sequence of momentarily stationary images each of which occupies a display state period. Using timing and spacing arrangements for this sequence the illusion of smooth motion is created.

In this specification a display state period refers to an interval of time which commences when picture elements on the display screen start depicting all the necessary information transmitted for a given stationary image and is maintained while such information is being depicted irrespective of the number of scans which might be necessary to complete this transmission of information and irrespective of the number of times that all the necessary and same information for that given stationary image is being scanned and/or transmitted. A display state period ends when picture elements on the display screen begin displaying information pertinent to a different momentarily stationary image. Hence a moving image is made up of a succession of stationary images each occurring in a new display state period. Other current technology is based on the assumption that it is necessary to transfer all or almost all of the information associated with a given stationary image onto the display screen during a display state period.

Accordingly, display surfaces for moving graphics such as messages in words, numerical information, advertising material and the like, are packed densely with picture element sources so as to enable the graphic to be displayed in full resolution at each of the momentary positions inherent in the illusion of smooth motion.

In contrast this invention is based on the assumption that to depict a moving message or image it is sufficient that only a slice or a fraction which may be $\frac{1}{8}$th of all the possible information associated with a given stationary image be displayed in a given display state period.

The reduction in the number of the picture element sources enables the few remaining picture element sources, say lights, to be arranged in widely spaced strips or in other arrangements as described below involving the equivalent number of picture sources. So long as there are three or more such strips, any observer can be caused to see a message or picture of arbitrary extent in motion over the whole display surface, even over the wide spaces between the strips or picture sources otherwise arranged.

We have found that the resolution of the picture as seen by the observer is a function of the density of picture elements in a direction orthogonal to the path of the apparent motion of the picture, that is the number of rows over which the picture elements are distributed, and that the resolution of the picture is independent of the density of picture elements in a direction parallel to the path of the apparent motion.

Our discovery may be illustrated by an analogy: Image that a man is looking at a sign behind a picket fence, and that the sign is in motion. At any instant he will be able to see only those parts of the sign which are aligned with, and accordingly visible through, the vertical slits in the picket fence. As time passes the whole of the sign will pass by and be visible through each of the vertical slits in the fence. Information about the sign will be accumulated at each of the slits and the activity caused at one slit will be repeated, in the same sequence, at the next slit in line as parts of the sign move by one slit and then the next. When certain factors, such as the correct speed of movement are present, an observer is able to see the whole of the sign in motion, despite the fact that his view is confined to activity in slits as the sign passes behind them. This is true even when the sign is very long, exceeding the length of the fence by a very large factor.

In the simplest form of our invention we replace the slits of our analogy by vertical strips of lights. In between the vertical strips are blank spaces corresponding to the pickets of the picket fence. The width of these blank spaces can be measured in numbers of columns or vertical strips without lights. For the sake of this description let each of the blank spaces be C columns wide. The graphic we wish to display is represented electronically as a numerical image or description, organised into vertical columns. The first strip of lights going from right to left of the screen, is caused to be intensified for a fixed period of time, which is a display state period, in accordance with the numerical values representing the first column of the graphic reading from left to right then, after the first display state period the second column of the grahic is displayed and so on for each column in turn, until each vertical column has been so displayed. The second strip of lights is intensified in the same manner as the first strip was C+1 display state periods ago. We can refer to a group of (C+1) display state periods as a display cycle. Thereafter, when the first strip is intensified in accordance with an arbitrary column M of the numerical image of the picture, the second strip is intensified in accordance with column M−(C+1) of the numerical image. Similarly, activity at the second strip is repeated at the third strip a further display cycle later, and so on for each successive strip.

Objectively described, the display comprises a set of widely spaced vertical strips, in which lights are distributed over up to n rows. Each strip of lights is intensified for each display state period in accordance with a numerical representation of a column of graphic information. The display sequence at one strip of the display system is repeated at the next after a display cycle.

Subjectively described, the display presents an observer with a sign apparently in motion and filling the whole display surface including the spaces between the strips of lights. The sign appears to move from the strip at which columns of the graphic are first displayed toward those at which columns are later displayed.

The vertical resolution of the graphic as seen by the observer is n, where n is the number of rows over which the lights in the strips may be distributed.

An observer is therefore caused to see a graphic in motion, containing, at any stage, up to as many picture elements in the vertical dimension as there are rows over which the lights in the strips may be distributed. The observer is also caused to see up to as many picture elements in each row of the horizontal dimension as there are strips of lights (S) plus the (S−1) groups each of C blank columns between these strips i.e. S+C (S−1).

The display surface itself may be regarded as a window through which a picture of n×[S+C (S−1)] picture elements may be visible at any instant. Graphics of artibrary length, such as very long passages of text may be displayed as it were by pulling the grahic past the window so that the whole may be read even through only part is visible at any instant.

The reduction of information utilized in this invention can be arbitrary—in the above example $\frac{1}{8}$th of the total possible information associated with a given stationary image was used. This fraction could have been 1/6th or 1/10th or some such fraction. A corollary of this is that suppose the relevent fraction is $\frac{1}{8}$th and hence only $\frac{1}{8}$th of all possible picture element sources on the screen are necessary, if a large number of these failed to work we have found that hardly any distortion of the total moving graphic results and the failure of these lights is unnoticeable unless massed in a row or column.

The discovery underlying the present invention is based on a phenomenon that has been known for some time in pyschology as beta apparent movement which has been characterised as follows "If two discs of light are presented briefly and in succession to different areas of the retina, movement tends to appear in the direction of the succession." However hitherto it has been considered that this phenomenon is relevent only in the context of simple forms such as discs of light or characters which are presented whole in one place and then another. It has now been discovered that it may be applied to more complex forms such as characters, ideographs, numbers and the like which are never presented whole but displayed in slices or sections of the whole at fixed display points to produce an illusion of whole characters moving continuously across a screen.

A graphic display system according to the inventon takes advantage of this phenomenon and provides a means for depicting such complex forms in movement on a display surface. For successful operation of the device however certain factors that govern the phenomenon of beta apparent movement must still be observed in the operation and functioning of the apparatus. One of the most important variables that govern the illusion is the time interval between the display of given information about a section or slice at the first display point and the display of the same information at the second display point. This time interval starts when the first display point begins its display and ends when the second display point begins its display and is therefore equivalent to a display cycle. It has been found that the invention operates best when this interval does not exceed 250 milliseconds.

This illusion applies to arrangements of lights other than the arrangement described. Strips of lights may be placed horizontally instead of vertically. By transposition, the description already given for the vertical arrangement of strips applies to the horizontal.

The illusion may also be produced by staggered arrangements of lights.

The display surface may be regarded as being made up of matrices each consisting of n rows and (C+1) columns. Each matrix will therefore contain n(C+1) cells. Arrangements of lights for a matrix ideally should be such that there are at least n lights per matrix and that each row contains one light. In the simplest case all lights are in one column, other columns being vacant. In other cases lights may be assigned to various columns, and these may be distributed over C+1 columns by a distribution operator. (It is not essential that C nor the distribution operator be constant for all matrices on the display surface). While this is ideal, in practice it has been found that less than n lights per matrix can be tolerated without detriment to the desired effect, but only if the information missing for a row in a matrix is carried by the corresponding light in an adjoining or close by matrix. Each matrix of the display may now be considered as a set of (C+1) columns, each column containing no lights, one light or between one and n lights. Each available light in each column is intensified in accordance with the numerical value of the picture element in a corresponding column and corresponding row of the grahic and in a position of the row occupied by the light within the strip.

Starting with the first matrix the first column is intensified where lights are available in accordance with the first column of graphic information. The second column of the first matrix is intensified, on the next display state period in accordance with the first column of the picture. Simultaneously the first column is intensified in accordance with the second column of the graphic. After the first display cycle all columns of the first matrix are being intensified, where lights are available, the $C+1^{th}$ column in accordance with the first column of graphic information, the $(C)^{th}$ column in accordance with the second column, and so on. Having completed the first display cycle, the first column of graphic information moves on to control the first column of the second matrix, the $(C+2)^{th}$ column of graphic information now controlling the first column of the first matrix. The process continues in this fashion until all matrices are active and lights within columns within them are under control of graphic columns in corresponding positions.

The discussion contained above relates to the nature of a display screen for use in a graphic display system according to the invention. It is now necessary to consider the means by which the information is transmitted to the lights of the display screen. Two basic approaches may be made to this which are for convenience described as a serial version and a parallel version the significance of these terms being made clear below.

Both version have in exemplary form the following parts in common:

1. A means to generate the graphic to be displayed on the display screen, which may be a keyboard or a teletype machine or a magnetic tape or some such code source.

2. A processor unit or memory which stores the graphic and arranges it in a suitable format for presentation to the display screen. In both versions the data presented to the display screen is arranged in digital form, i.e., either a 1 or a 0 where 1 will be an instruction for a light to intensify, and 0 an instruction to remain off, or vice versa.

3. A data line or lines that link the processor unit or memory to the display screen.

4. The display screen itself which for the purposes of the following description will consist of 32 columns each with 16 L.E.D.'s (light emitting diodes) and each column occurs after an interval of seven blank columns and one column of lights in width represents one column in width of the graphic to be displayed. (The number of lights per column, the type of light, the number of columns per display screen and the width between columns are all variables which are not fixed and the values chosen here are determined by convenience).

Whre the two versions differ is in the manner in which the data is taken from the memory and conveyed to the display screen. On this screen for all information arriving via data lines, or some such lines, two distinctions must be made—

(a) which of the 32 columns it is addressing, and (b) which of the 16 positions in any one column it is addressing.

The SERIAL VERSION answers these problems in this manner:

The data is taken out of the memory as a string of single bits in series. The bits arrive one at a time via one data line at the first column of lights, and when as many bits have arrived as are necessary and sufficient to give "instructions" to all the 16 lights in the first column, the appropriate lights in that column are intensified. The order in the series determines for which of the 16 lights the instruction is meant. Thus, in this instance, the first instruction will apply to the first light of the first column, the second instruction in the series to the second light of the same column, etc. In this example the first column is linked to the memory and receives the first series of 16 instructions. This column has its own local memory in which the bits are stored as they arrived, one at a time. After the intensification of its lights the memory in column 1 is clocked into a similar memory in the first of the seven blank columns following column 1, the information is therefore not displayed. After each display state period the information is clocked into the next column and the procedure continues along the screen with the information being displayed whenever it arrives at a real column. Therefore the second column of lights is fed from the seventh blank column after the first column of lights. Each column is dependent completely on the immediately preceding column and local 'memories' at each column are a sine qua non of this operation.

In the PARALLEL VERSION each column is fed data separately and discretely by the memory. The memory transmits the data to column 1, then to column 2, etc. Whereas in the serial method, what appears on one column must appear on each and every other column; in the parallel method, if it were so desired, different columns could display different data. Thus every column has its own line linking it to the processor unit or memory. In this example there would be 32 such lines.

The problem of addressing each light in each column is also approached differently. Each column has 16 lights; therefore, across the surface of the display there are 16 rows of lights. Each row is addressed separately.

Instead of the data leaving the memory in a series or string, in the parallel version it is organised into blocks of 16 (16 bit words) before transmission where the total 16 bits make up the information for a complete column. There are 16 different data lines linking the processor unit or memory to each of the 16 lights in column 1, and the data for the first row is on the first of these data lines, the data for the second row on the second data line etc. Thus all of the 16 bits carrying all the necessary information for column 1 are transmitted simultaneously instead of one at a time.

This method of addressing lights means that the data for lights in a particular position in a column is independent from data for lights in another position. In the serial version, whenever one data bit is dropped or lost, every subsequent data bit will be out of step unless some check is continually used, but this is unnecessary for the parallel version.

From the above discussion it can be seen that there are two approaches (i.e., parallel and serial) to each of two problems (column address and light address). Two embodiments of the invention described below are pure parallel and pure serial. Hybrid and other versions are also possible.

Figure 3:
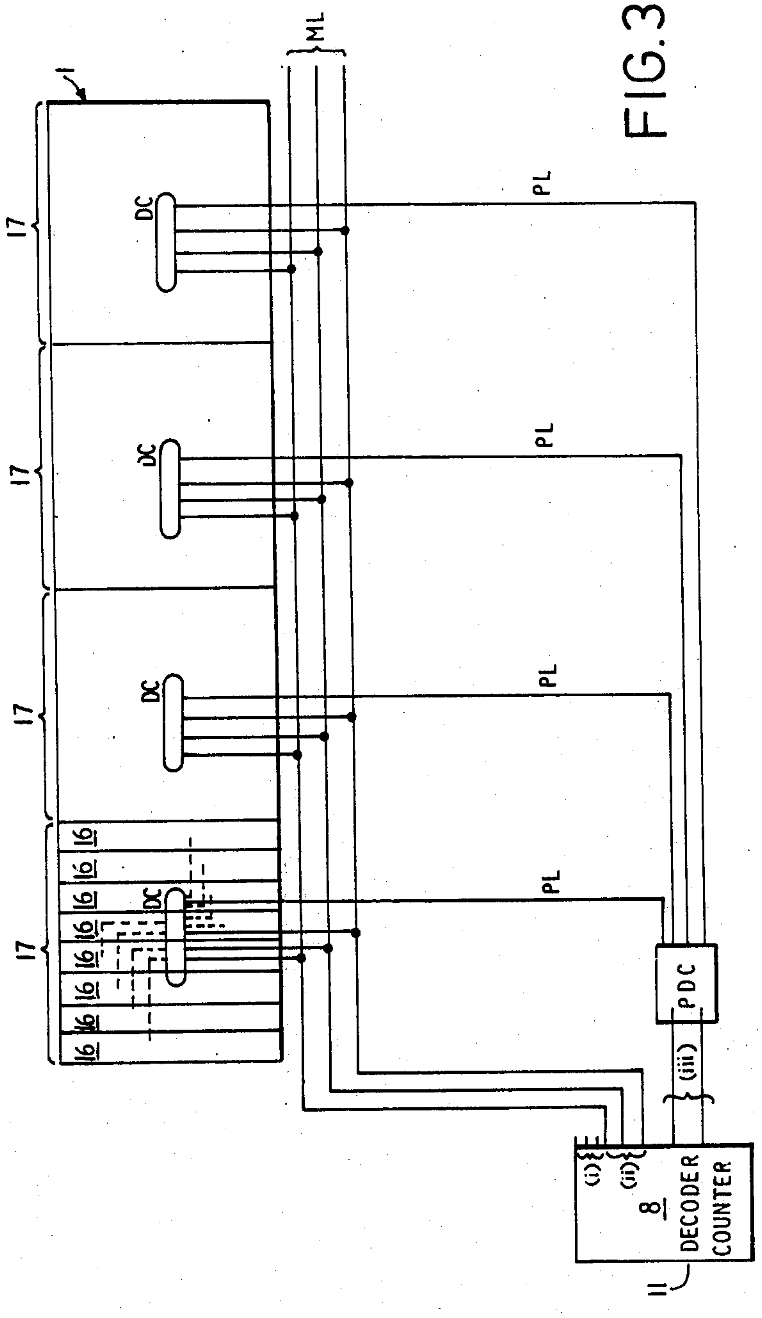
Figure 4:
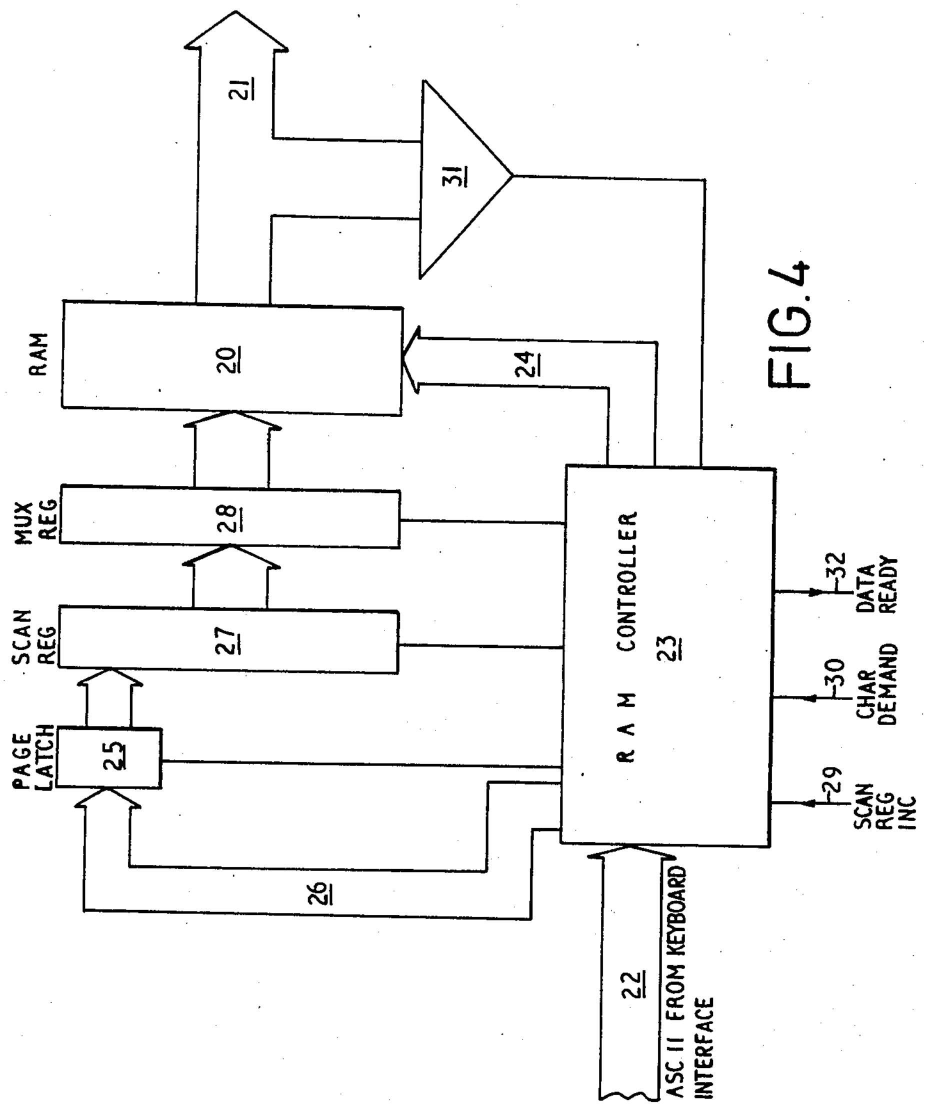
Figure 5:
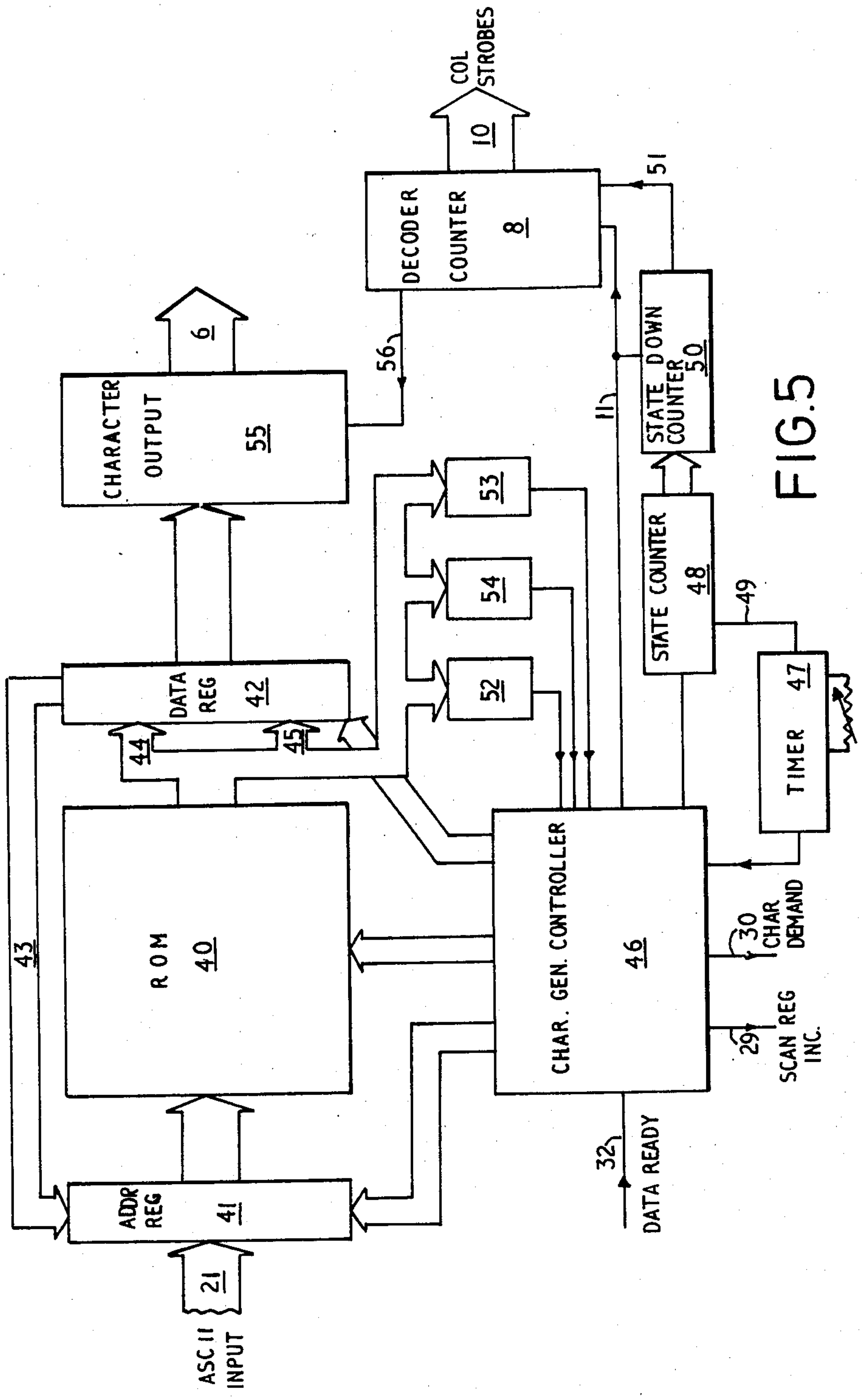
Figure 5A:
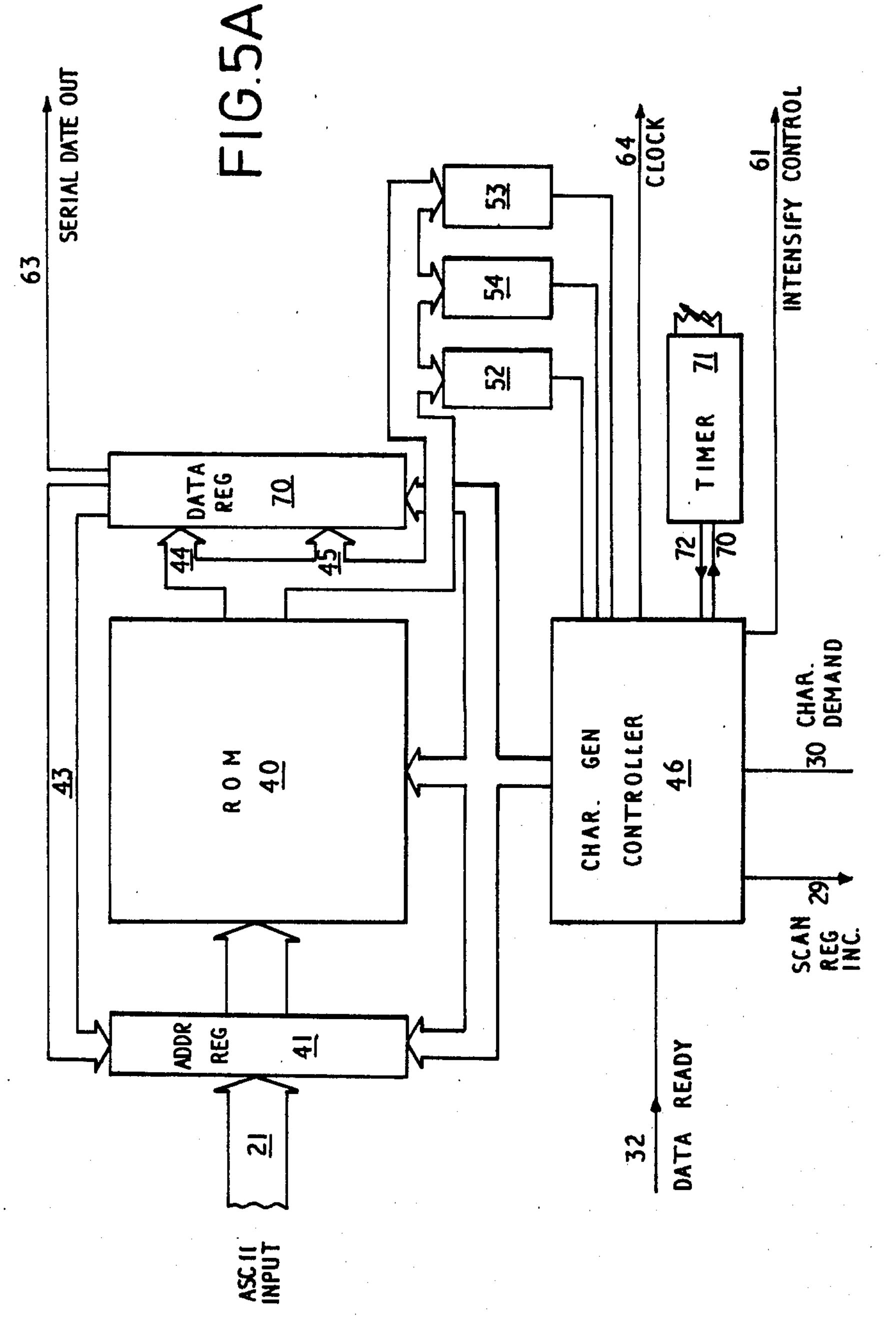
Figure 6:
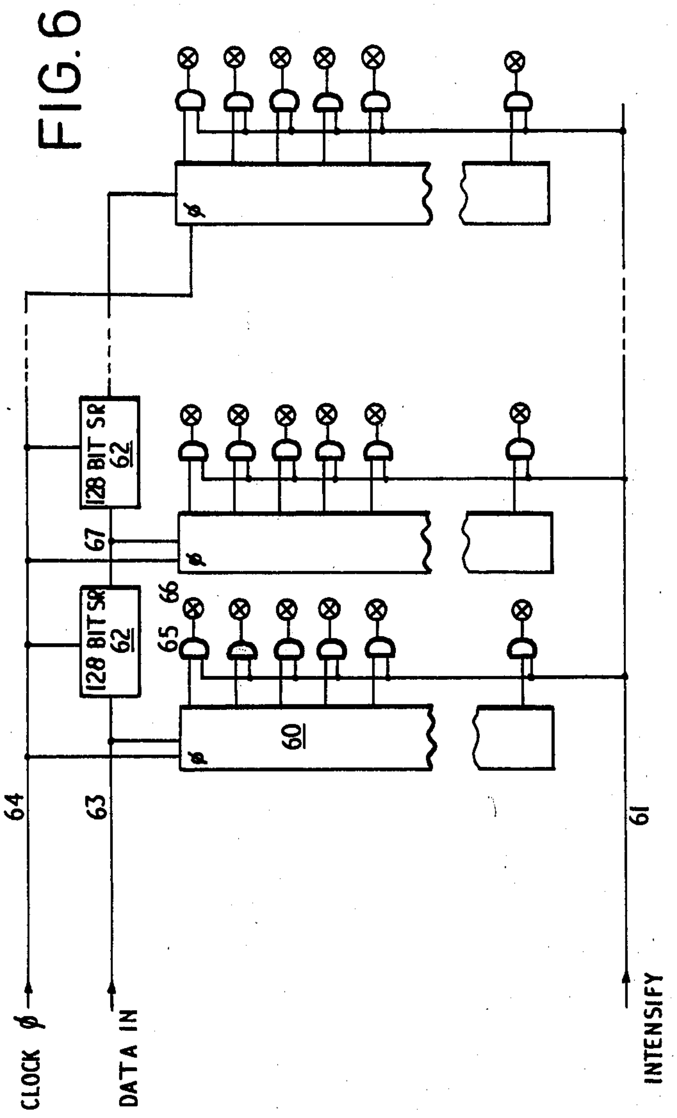

In order that the invention may be better understood and put into practice preferred forms thereof is hereinafter described by way of example with reference to the accompanying drawings in which:

FIG. 1 is a diagram of a graphic display system according to the invention in which the columns and lights of the display screen are addressed in a manner according to the parallel version described above, FIG. 2 is a diagram showing the circuitry associated with the illumination of an individual light on the display screen, FIG. 3 is a diagram illustrating a refinement of the arrangement for addressing the columns of the display screen shown in FIG. 1, FIG. 4 is a diagram illustrating the manner in which the message to be displayed on the display screen is stored and retrieved, FIG. 5 is a diagram of the character generator illustrating the manner in which the information is taken and arranged and presented in a suitable format for the display screen, FIG. 5*a* is a diagram similar to FIG. 5 but illustrating a serial version of the character generator illustrated in that figure, and FIG. 6 is a diagram illustrating the circuitry on the display panel for a serial version.

A visual display system according to the invention must perform two basic functions on its display screen:

(1) to place there a momentarily stationary image or pattern which can be done only by using an addressing technique to find particular lights in certain rows and columns. (Naturally this stationary image would be fragmented and in pieces as a great number of lights are missing on the display screen.), (2) to make this image or pattern appear to a normal observer to move across the face of the display screen in a desired direction and during its movement seem to represent a complete graphic.

How these functions are performed is described below:

Reference is now made to FIG. 1 which depicts the necessary equipment for the parallel version to address the display screen.

In this diagram: 1 is the display screen, and a section only of the complete surface is depicted. 2 And 3 are both vertical columns, each containing 16 L.E.D.'s (light emitting diodes). 4 Represents the gap between these columns which is made up of 7 columns, each without any lights, and these are therefore called "blank" columns. This structure viz., one vertical column of 16 lights followed by seven blank columns is repeated across the surface of the display screen until there are 32 columns, each with 16 L.E.D.'s and by deduction there will be $31\times7=217$ blank columns, making a total of 249. (For purposes of making an extended display system by adding module to module, the seven blank columns after the 32nd column of L.E.D.'s would be required, making a total of 256 columns). There are $32\times16=512$ L.E.D.'s on the display screen. Likewise there are 16 rows of lights across the screen, each with 32 lights.

5 Is the character generator which is fed the data constituting the message and organises it in a suitable format for transmission to the display screen. In this embodiment since there are 16 L.E.D.'s in each column of the screen the character generator organises each graphic to be displayed into columns and each column contains 16 bits—1 bit for each L.E.D. The bits are either 1's or 0's indicating an "off" or "on" instruction for the relevant L.E.D. These 16 bits comprising the total information for a column are called a 16 bit word.

The letter "B" which might have to appear on the screen could be presented as follows to the screen:

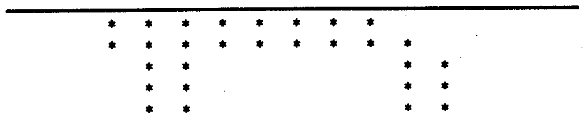

-continued

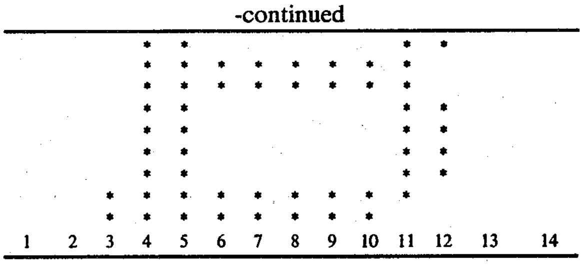

This character is made up of 14 columns. For purpose of processing there are two types of columns—those without information such as columns 1, 2, 3, 13 and 14, or space columns, and those with character information, such as columns 3–12 inclusive—making up the character width of 10 body columns. The third column which starts the body columns is made up of 4 binary 1 bits, counting vertically. The fourth column contains 14 binary 1 bits, as does the fifth column also while the sixth column has 6 binary 1 bits.

6 Are 16 lines going from the character generator to each of the 16 rows of lights on the display screen. These data lines are linked to the appropriate bit in each column of the character in the character generator such that the top bit in a column corresponds to row 1 on the display screen, the second top bit to row 2, etc.

Each L.E.D. on the display screen has attached to it an AND gate and a latch (SCR) as shown in FIG. 2.

The AND gates for all L.E.D.'s in a particular row are linked together on one of their inputs by a common data line 7 which in turn is connected to the appropriate data line of 6.

In FIG. 2, 13 is the AND gate for which 7 is the data line corresponding to 7 in FIG. 1 and gives the row reference; 12 is the strobe line corresponding to 12 in FIG. 1 and gives the column reference (explained below). This AND gate 13 switches on the SCR driver/latch 14 with a trigger pulse and the SCR driver/latch 14 then latches on the required time interval for which the L.E.D. 15 must be on. This interval in our example will be 10 milliseconds.

When the display system is activated, the character generator starts to present its information in 16 bit words in a manner referred to in the description of the character generator below. As each 16 bit word is presented, whenever a positive bit occurs, it transmits a DC voltage along 6 to the appropriate data line 7 and then it activates one leg of each AND gate 13 in that row.

The column reference is achieved by use of what may be conveniently referred to as a decoder counter 8, consisting of a counter that counts the columns of the message as they are output from the character generator and a decoder which decides when these correspond to a column containing lights on the display screen. On this decoder counter 8 there is a unique output for every column, both blank and real—these are indicated at 9. However, only those outputs that are directed to real columns are used, viz., the 1st, 9th, 17th columns etc. The outputs 9 of the decoder counter 8 are connected to the appropriate columns by strobe lines 10. At the back of each column the second legs of the AND gates 13 for all L.E.D.'s 15 in that column are linked together vertically and this vertical link 12 connects up with the appropriate strobe line 10. Thus via their AND 13 gates each L.E.D. 15 has a column and a row reference and can be addressed individually.

The decoder counter 8 generates its column reference as follows:

As each column of a character in the character generator 5 is presented, a pulse is transmitted via a line 11 to the decoder counter 8. This pulse serves to signify that the data on line 6 is "valid." It also serves the purpose of incrementing the decoder counter 8 by one as each new column is presented and thereby generating a column count. Thus the decoder counter 8 can be described as being synchronous with the character generator 5. When the character generator has read column 1, the decoder counter 8 emits a pulse along strobe line 10 leading to column 1 on the display screen 1.

As this principle leads to clumsiness in the number of strobe lines used, i.e., 32, the following refinement illustrated in FIG. 3 is introduced.

The difference between the row links or data lines 6 and the column links or strobe lines 10 is that the row links carry data to each of the 16 different rows at the one time, but only one column can be addressed at any given point of time. This enables the strobe lines to lend themselves more easily to the following refinement:

The display screen 1 is arranged into three sections and reference is now made to FIG. 3:

(1) Matrices 16

A matrix 16 is made up of 8 consecutive columns—in this embodiment it would consist of 1 real column of 16 L.E.D.'s and 7 blank columns.

(2) Panels 17

A panel 17 is made up of 8 matrices as described above.

(3) Modules

A Module is made up of 4 panels 17 as described above. It therefore contains 32 matrices.

The problem of addressing a column is now resolved into locating a column in a matrix 16 in a panel 17 in a module. Using binary notation the 8 columns of each matrix can be addressed by using 3 binary digits, the 8 matrices of each panel can also be addressed by using 3 binary digits and the 4 panels by using only 2 binary digits.

The decoder counter 8 therefore is arranged into octaves as shown in FIG. 3, where —

(i) represents 3 outputs to address the columns inside a matrix;

(ii) represents 3 outputs to address the matrices inside a panel;

(iii) represents 2 outputs to address the panels in a module and

(11) is the line carrying a pulse from the character generator 5 to increment the decoder counter 8.

The pulse indicating the column count increments the decoder counter 8 by 1 at each step. Because the message displayed the screen 1 moves in a given direction, the decoder counter ensures that the columns are addressed in the correct sequence. The first octave (i) in the decoder counter 8 counts from 0 to 7 to address each of the 8 columns in a matrix and on the count of 8 moves to the second octave (ii). If all the 16 lights in a particular matrix are concentrated into one column and the other seven columns are blank ones the first octave (i) is really redundant. (If the 16 lights were scattered over more than one column of a given matrix then the first octave would be used together with an intergrator function.).

In this preferred embodiment we can dispense with the first octave so there are only five strobe lines marked ML and pL in FIG. 3 from the decoder counter 8 to the display screen 1. The three lines marked ML on FIG. 3 from octave (ii) of the decoder counter 8 address the matrices 16 and run across the length of the display screen 1.

At the back of each panel 17 is a BCD (binary coded decimal) decoder chip or some similar decoding device as marked by the rotation (DC). Each of these chips is linked on the one hand by a circuit to each of the 8 matrices belonging to that particular panel and on the other hand to each of the three strobe lines ML referred to above. As the information arrives from the strobe lines it is decoded and the appropriate matrix 16 activated. But so far all four panels 17 are receiving the same information.

The remaining two outputs from the decoder counter 8 which give the panel reference are likewise fed into a decoding chip PDC either on the display screen or in the control box which may be situated some distance from the screen. The decoding chip then branches out into four separate strobe lines PL and each line goes to one panel 17 and by appropriate pulsing gives the panel reference.

In effect we end up with 5 strobe lines if the PDC chip is on the display screen and 7, if it is remote.

From this preceding discussion it can be seen that the manner in which the display screen is addressed is dependent on how the information associated with the graphic to be displayed is organised.

The second main function of the display system as mentioned earlier is to make the momentarily stationary image or pattern on the display screen appear to a normal observer to move across the face of the screen in a desired direction and during its movement seem to represent a complete graphic. The manner in which this is accomplished is once more related to how the information associated with the graphic to be displayed is organised. Associated therefore with an explanation of this second main function is a description of the character generator.

The information for a given graphic is organised as follows:

1. The text of a graphic or message to be displayed on the screen is spelt out in a code source which may be a keyboard, a teletype machine or some such device.

2. The graphic comes from the code source with each character in it converted to 8 bit ASCII code, this enters a RAM 20 (random access memory) via the RAM controller 23 where it is stored in sequential (FIG. 4) address locations.

The character generator 5 and the RAM 20 are located in a control box which may be remote from the display screen.

3. When the apparatus is switched onto the display mode (i.e., the message has to appear on the display screen) the text of the message in the RAM 20 is fed in ASCII code sequentially (i.e., 1 address location at a time in increasing order of address magnitude) to the character generator 5.

4. The character generator 5 is composed of a ROM (read only memory) binary counters and latches and other logic devices See FIG. 5. The ROM 40 is divided into two sections, an address field and a character format section. In the character format section the information about each character is built into the ROM 40 in a standard format (designed by an artist or some such person) suitable for presentation in component columns as mentioned above. In this embodiment all of this information occupies more than 3.5 K bytes. To reference so large a section and find the relevent information for a given character, an address field is used.

The 8 bit ASCII code representing a particular character arrives from the RAM 20 at the character generator 5 via the output 21 where it is directed to the address field via the address register 41. The address field converts the 8 bit ASCII (as this is insufficient to address so large a memory) into a 12 bit binary address which appears in the data register 42.

This 12 bit binary address is then transferred back by the lines 43 to the address register 41. The address register 41 now points to the correct location in the character format section. Reference is now made to the diagram below which details the procedure by which the graphic "B" is located and presented.

either side of "B" and 1010=10=10 columns comprising the body of "B." The total width of the graphic "B" will therefore occupy 14 columns. [Using one byte for the control word implies that the maximum number of space columns or the maximum body columns will be 1111=15 leading to a configuration of 15 space columns, 15 body columns and 15 space columns =45 columns. Also this procedure implies a symmetrical number of space columns flanking a character.]

The information from this control word causes as many pulses as there are space columns to be transmitted to the decoder counter 8 via line 11 such that the body of the graphic will be displaced accordingly.

This incrementation of the decoder counter 8 occurs before the address register 41 can progress to its next location i.e., 2061 (octal). Reference is again made to the above diagram.

At location 2061 is a byte reading 11000000 in binary

| RA | LI | RA | LI | | CN |
|---|---|---|---|---|---|
| 0000 | 000 | 0000 | 000 | | 14 I |
| 0000 | 000 | 0000 | 000 | | 13 I |
| 2103 | 074 | 2104 | 360 | | 12 I |
| 2101 | 177 | 2102 | 370 | | 11 I |
| 2077 | 303 | 2100 | 014 | | 10 I |
| 2075 | 303 | 2076 | 014 | Body | 9 I |
| 2073 | 303 | 2074 | 014 | width | 8 I |
| 2071 | 303 | 2072 | 014 | of | 7 I |
| 2067 | 303 | 2070 | 014 | 10 | 6 I |
| 2065 | 377 | 2066 | 374 | | 5 I |
| 2063 | 377 | 2064 | 374 | | 4 I |
| 2061 | 300 | 2062 | 014 | | 3 I |
| 0000 | 000 | 0000 | 000 | space width | 2 I |
| 0000 | 000 | 0000 | 000 | of 2 | 1 I |
| | control | | | | |
| 2060 | 052 | | | | |

```
14 I
13 I
12 I        * * * *     * * * *
11 I      * * * * * * * * * * * *
10 I    * *         * *         * *
 9 I    * *         * *         * *
 8 I    * *         * *         * *
 7 I    * *         * *         * *
 6 I    * *         * *         * *
 5 I    * * * * * * * * * * * * * *
 4 I    * * * * * * * * * * * * * *
 3 I    * *                     * *
 2 I
 1 I
```

RA = ROM Address
LI = Light Information
CN = Column Number

The ASCII 8 bit code is converted at the address field of the ROM 40 into a 12 bit binary address 010000110000 which in octal notation is 2060. The address register 41 is loaded with 2060 (octal). This address is shown in the bottom left hand corner of diagram 2. At this address the information relevant to the graphic "B" has been stored in sequential address locations and each address location is made up of 1 byte. As stated earlier, each column on the display screen in this embodiment has 16 lights and requires 16 bits of information; 2 bytes make up one column.

A graphic can have two types of column—the body columns and the space columns which precede immediately and succeed immediately the body column. As the space columns will be identical in information contained irrespective of what graphic they occur in, it is redundant to repeat this information for each graphic. Therefore to save storage space in the ROM 40 those bytes referring to the space columns are omitted. Each graphic at its sequential address location commences with one byte which summarizes the column information in the format of that graphic, stating how many of each type of column occurs. This byte is called the control word. In the above diagram it is located at address 2060 and is shown as 052 in octal or 00101010 in binary notation. This control word is split in half such that the most sigificant four bits designate the number of space columns on either side of the body columns and the least significant four bits designate the number of body columns. Thus 0010=2=2 space columns on code or 300 in octal. Reading across the diagram it can be seen that this information relates to the top half of column 3 of the graphic "B" and that the first two LED's in that column will have to be switched on and the following six LED's will remain off. Address location 2062 has a reading of 00001100 or 014 (octal) and accordingly for the second half of this particular column the first 4 LED's will remain off the next two go on and the remaining two are off. In column 4 of the character "B" the first 14 lights are switched on so location 2063 reads 11111111 or 377 and location 2064 reads 11111100 or 374. etc.

As the information for a column is contained in two bytes each at a different address location the total information for any column is compiled by registering the first byte via lines 44 in the top half of a 16 bit parallel shift register also referred to as the data register 42 and the second byte via lines 45 into the bottom half of the same register 42.

When the register 42 is full a pulse is sent to the decoder counter 8 via the character generator controller 46 along line 11 signifying by the rising edge of the pulse that the data is valid and by the falling edge of the pulse incrementing the decoder counter 8. (The functions of the character generator are co-ordinated by the character generator controller 46 which is composed of logic devices and also provides a link with the RAM controller 23.)

This procedure is repeated until all the columns in the body of the character are "read." [It is to be noted that this character generator 5 uses an address field accessible by ASCII code and also a control word. The control word in particular by dismissing the storage of information pertinent to space columns permits an economical use of space within the ROM 40. A repetoire of 200 characters each of 16 columns or less including space and body columns, would require about 6.4 K bytes but the technique used has reduced this to less than 4 K bytes.]

[One of the advantages that accrues is a variable thickness of body and spaces so that punctuation marks such as periods and commas do not occupy as many columns as a letter of the alphabet. This is also more aesthetically pleasing in the balance that is given to the message appearing on the display screen 1.]

In this introduction to the character generator 5 the manner by which each individual graphic is translated from the code source to the display screen has been described. But a graphic can be made up of a combination of words and/or numbers and/or ideographs etc.

The manner in which the character generator 5 deals with this sequence of graphics and makes them appear to move on the display screen 1 is now explained.

The RAM 20 can hold 1024 single graphics in this particular embodiment. For the sake of easy reference this repertoire is arbitrarily divided into 8 sections or pages and each page is made up of 128 single graphics. The page reference is generated by a 3 bit address from the keyboard (not shown). This address is carried by the ASCII code which comes from the Keyboard interface via the lines marked 22 to the RAM controller marked 23 which is made of AND gates or OR gates and other such logic circuitry.

This RAM controller 23 co-ordinates both the functions within the RAM 20 and between the RAM 20 and the character generator 5. From the controller 23 the message itself is fed into the RAM 20 via the lines marked 24 while the page reference is conveyed to a latch called the page latch 25 via the lines marked 26.

It is therefore possible to store a graphic in page 6 without necessarily filling the first five pages.

Once the graphic is stored in the RAM 20 it is fed in a series of steps or scans via the lines 21 to the character generator 5 (See FIG. 1).

As the display screen 1 is of a fixed length each scan is also of a fixed length and during the course of the progression of these scans through text the starting point and the finishing point of each scan will alter. These two variables viz. where the scan starts and over what length it extends are controlled by two registers one of which is called the scan register 27 and the other the multiplex register 28. The scan register 27 defines the starting point of the text in the RAM for a particular scan. Its initial position will be given by the page latch 25. The multiplex register 28 starting from the point indicated by the scan register 27 proceeds along the length of the text in successive address locations feeding each individual graphic in turn to the character generator 5 (FIG. 1) and continues to do so until it encounters either a command in text signifying the end of the text or until it receives a signal indicating that the display screen 1 has been filled or fully scanned. When this occurs the multiplex register 28 reverts to the value indicated by the scan register 27. It takes the multiplex register 28 only 640 microseconds or so to complete each scan. In this parallel version time division multiplexing is used.

[Multiplexing refers to the fact that the information is not displayed simultaneously during a scan but at a rate of only one column at a time in the correct sequence of movement.

As each scan period last 640 microseconds so each column will be on for 1/32 of this time i.e. 20 microseconds. This change of columns is occurring so rapidly however that a normal observer would see all 32 columns illuminated at any one time. During a display state period which in this embodiment lasts for 10 milliseconds there are 15 scans therefore each column would be on for 300 microseconds. While this is pure multiplexing each individual light is only on for so short an interval that this impairs its brilliance. To counteract this latches are used as shown of FIG. 2 to increase the duty cycle for each LED such that a duty cycle of over 90% is obtained.]

Both registers 27 and 28 are addressing individual graphics and these are broken up into appropriate columns only in the character generator whence they are conveyed to the display screen 1.

On this screen 1 each display state period advances the graphics at the rate of one graphic column opposite to the desired direction of movement.

As each display state changes, this advance must be controlled by the character generator 5 (where the columns are) not by the RAM 20.

The duration of the display state period is controlled by a timer 47 located in the character generator 5. This timer 47 is adjusted to a regular and appropriate interval which for the sake of this example has been stated as 10 milliseconds. At the end of each display state period the timer 47 sends a pulse to an upcounter called the state counter 48 which is connected to it via 49. This pulse increments the state counter by one. When the initial display state period occurs the state counter 48 being set at zero. The initial display state period is explained as follows:

For the sake of explanation let us assume that the graphic appearing on the display screen is moving from the viewer's right to the viewer's left. The graphic therefore may initiate at the right hand edge and creep across the screen or else the screen may fill up instantly and the graphic proceed off the left hand edge. For this example let us assume the latter case. In this initial display state the individual graphic on the left hand edge of the screen is leading the procession and is different from all other individual graphics insofar as at each new display state period one of its columns "disappears" off the left hand edge so that this individual graphic becomes shortened and is in a state of decay. This leading graphic then must be accounted for in a different manner from the other characters making up "the train of the procession." The state counter 48 is associated with this leading graphic. When the state counter 48 registers 0 that means that column 1 (counting from left to right) of the leading graphic is on the display screen 1 but up against the left hand edge. At the end of the first display state period the timer 47 pulses the state counter 48 which increments by 1 and registers 1. This means one column of the leading graphic must go off the edge of the display screen and all successive columns advance by one position in the desired direction of movement.

The state counter 48 effects this in the following manner: it causes the decoder counter 8 to be disabled until the number of columns in the leading graphic presented by the character generator equals the count in the state counter. Associated with the state counter 48 is a down counter 50 called the state downcounter. At the beginning of each scan it is loaded with the number in the state counter 48. (While the number in the state counter 48 changes with each display state period, it remains constant for each of the 15 scans during one display state period.) The state downcounter 50 is decremented by the pulses on line 11 and when it is zero the decoder counter 8 is enabled. It the state-counter at any time, for example, registers 2 this means that the first two columns of the leading graphic have gone off the left hand edge. The character generator 5 has sent 2 pulses via line 11 to the decoder counter. During these pulses the decoder counter 8 was disabled by the state downcounter 50 via line 51. As there is now a parity between the count in the state counter and the number of pulses directed to the decoder counter which have been blocked, the decoder counter 8 is now unblocked and the information for column 3 is the first information the decoder counter 8 receives so it transmits this information to column 1 on the display panel 1.

The above procedure continues until the timer 47 has counted sufficient display state periods to account for all the columns that made up the leading graphic on the display screen.

In the graphic "B" there were 14 columns and when these have all passed off the screen the state counter 48 will record 14. But associated with each character is another type of counter which is not linked to the timer. These are downcounters and there are three of them 52, 53 and 54 used simultaneously with the state counter. Earlier it was stated that the first byte or control word in the sequential address locations in the ROM 40 for a given graphic contained the column information. The data from this byte is stored in these three downcounters 52, 53, 54—one 52 for the space columns preceding the body columns, one 53 for the body columns and one 54 for the space columns succeeding the body columns. When all the columns that comprise the character in question (the first and third of these downcounters 52 and 54 will contain the same information) have been processed and their information transmitted to the display screen all these three downcounters will register zero. But the state downcounter 50 still has a number, 14, in it. An anomalous state is reached which is a cue for the character generator 5 to take the next character in sequence from the RAM 20. During the presentation of the leading graphic "B" while the 14 columns were being processed the scan register 27 for the RAM 20 was set at B. Once "B" has been processed this scan register 27 has to increment by 1 and go on to the next individual graphic. This is effected by an AND gate which, when the anomalous state, defined above is reached sends a pulse to the scan register in the RAM via the line marked 29 thereby incrementing it by one. After this has happened and a new graphic is to lead the procession the state counter 48 resets at zero and the new character appears intact at the left hand edge of the display screen 1. (It can be seen that because the state counter 48 is reset at zero for each new leading graphic the operation of the state counter is not dependent on what form the initial display state period took).

The character generator 5 therefore controls the scan register 27 progressively shifting its starting point along the graphic. The character generator 5 also controls the multiplex register 28 for the RAM 20. Like the scan register 27 the multiplex register 28 is providing individual graphics but the progression across the screen 1 is at the rate of one column at a time and the columns are in the character generator. The multiplex register 28 must be signalled when to proceed to a new individual graphic.

Therefore at an arbitrary point of time, while the character generator is presenting the current graphic to the display screen 1 a signal is sent to the RAM controller 23 via a demand line 30 connecting the character generator 5 to the RAM 20. This signal increments the multiplex register 28 and the multiplex register 28 will encounter either another grahic or else a command in the text of the message.

Whatever it encounters is screened by the RAM controller 23 through the comparator 31 and if it is another individual graphic then at the appropriate time the RAM controller 23 sends a signal to the character generator 5 via a "data ready" line 32 and after that the individual graphic is presented to the character generator 5. If it is a command (e.g. end of message) the RAM controller 23 notifies the character generator 5 which subsequently reacts accordingly such as transmitting blank spaces on to the display screen 1. When the ROM 40 has finished processing the current graphic it collects the next individual graphic presented by the RAM 20.

There has been described so far the manner in which single graphics and a string of individual graphics are placed on the display screen and how the information for these characters is advanced. During the course of this description reference has been made to a timer 47 which gave a display state period of 10 milliseconds. This display state period is related to the time interval referred to earlier. This time interval is very critical to create the illusion of apparent movement for a normal observer, as was made clear earlier in the specification. If each display state is 10 milliseconds and C=7 it will be appreciated that the timer interval will be 80 milliseconds. It has however to be emphasised that the time interval is not rigidly fixed. In practice for a given piece of apparatus the best time interval is established experimentally within the bounds mentioned earlier.

Associated with this timing a constructonal feature of importance for the graphic display system according to the invention is the choice of lights for use in the display screen. These must be capable of the rapid rise and fall times necessary for operation of the apparatus and preferably also have long working lives under these operating conditions. Light emitting diodes are therefore preferred but for larger signs lights such as xenon lights could be used and no doubt future technological developments will see the introduction of other suitable devices.

Finally the manner in which the parallel version selects ⅛th of the total information for a given stationary image is described below. Reference is again made to FIG. 5. As mentioned earlier the decoder counter 8 is divided into 3 octaves. The first of these octaves (i) counted columns and had no links to the display screen 1. However within the decoder counter 8 this octave is coded such that when all 3 outputs register 0 (meaning column 1) a signal is sent via line 56 to a device called the character generator output 55 which is made up of drivers and latches. When the 16 bit parallel shift register 42 is loaded with information for a column a pulse is sent via 11 to the decoder counter 8. The rising edge of this pulse indicates data valid and if the first octave in the decoder counter 8 is set at zero a pulse is sent to the character generator output 55 which clocks in the data from the 16 bit parallel shift register 42 and when this is effected transmits that data to the rows along the lines marked 6. When the first octave in the decoder counter registers any number greater than 0 but equal to or less than 7 the character generator output does not clock in any information and so 7 out of 8 columns of information are thereby ignored. (While in this embodiment that fraction of the information not used is ignored it is conceivable that it could have been read and all or part of it stored in an appropriate device such as an 8×16 parallel shift register and at an appropriate time utilized).

The reduction of information transmitted to the display panel in this parallel version results in a general baud rate reduction to $\frac{1}{8}$th compared to other visual display systems of equal resolution and equal multiplex period.

Having described the parallel version in detail the serial version can be understood in reference to the preceeding discussion. The serial version is functionally the simpler of the two embodiments but requires a large duplication of parts. The number of parts on the display screen 1 in particular increases. For every column of lights (or in each matrix) it is now necessary, to make the following changes from the parallel version. Reference is now made to FIG. 6 which depicts each of the 16 LED's (66) for two consecutive columns and the end or 32nd column of this embodiment.

Each LED still has a driver and an AND gate as depicted in FIG. 2 but the links connecting one leg of the AND gates in rows and the other leg of the AND gates in columns are eliminated. The AND gate is marked 65 in FIG. 6 and one leg of each of the 16 AND gates for a column of lights is connected to a 16 bit shift register serial in parallel out; 60. Into this shift register 60 is clocked (by line 64) via line 63 the data in serial form as described earlier.

After this shift register 60 is loaded whenever a binary 1 bit occurs signifying "light on" one leg of the AND gate 65 for the appropriate LED 66 in that column is activated. After 16 clock pulses (i.e. as many clock pulses as there are LED's in a column) the timer 47 in the character generator 5 emits a pulse along line 61 which activates the other leg of the AND gates 65 and thereby illuminates the appropriate LED 66. This period of illumination lasts for an adjustable period in this case 4 clock cycles after which the next lot of data begins to be loaded into this shift register 60. It will be appreciated that in the serial version a certain period of time is "lost" while the shift register 60 is loaded in serial manner. As mentioned earlier the timing of a display cycle is important to enhance the illusion of apparent movement. In this example a display state has a period of 10 milliseconds and for the serial version must span the time taken to load the shift register and the intensification.

[In the parallel version the 10 millisecond period includes the multiplex period i.e. the time required for one scan of 640 microseconds. All duty cycles of both versions are then limited, but above say 90% the intensity increase is negligible and may not appear as bright in fact due to less active stimulation of the eye. In any case a lesser duty cycle preserves the life of the LED for a given current.]

However by using a faster pulse to clock the data into the shift register 60 and a greater count for the intensification period a greater duty cycle for the serial version can be obtained.

When the data was being clocked into shift register 60 via line 63 it was also being clocked via the same line 63 into an 8×16=128 bit serial shift register 62. After the first intensification period the data for a new graphic column is clocked into shift register 60 and also into shift register 62. This procedure continues for 8 intensification or display state periods at the first column after which the 8×16 bit serial shift register 62 contains 8×16 bits of information. When the 9th column of the graphic is being clocked simultaneously into shift registers 60 and 62 the first 16 bits loaded into 62 are fed out in serial form to the shift register 60 associated with the second column of lights and also the shift register 62 also associated with that column via line 67. Thus when the ninth column of the graphic appears on the first column of lights the first column of the graphic appears on the second column of lights and this procedure continues along the entire length of the screen i.e. for 32 columns.

Accordingly the following changes occur in the character generator 5 as shown in FIG. 5A. The state counter 48 and the decoder counter 8 together with the character generator output 55 are dispensible. The information for a graphic column is loaded from the ROM 40 into the data register 70. Whereas in the parallel version this data register was a 16 bit parallel shift register, in the serial version it is a 16 bit shift register, parallel in, serial out. Once the data register 70 is loaded the information is clocked out by 16 clock cycles controlled by a divide by 16 counter situated in the character generator controller 46. The information leaves the data register 70 via the data line 63 together with a clock pulse travelling along line 64 from the controller 46. When 16 of these clock pulses have occurred which is sufficient to empty the data register 70 the controller 46 sends a pulse via line 70 to a timer 47 which is activated for a predetermined period of time (which as mentioned in the above example may be a period equal in duration to 4 clock cycles). The timer 47 activates the controller 46 via line 72 and the controller 46 sends an intensification signal along line 61 to the screen. When the 16 clock pulses as described above have occurred a signal is also sent to the address register to present the next 16 bit word in the ROM to the data register 70 and the process then repeats itself.

The parallel version unlike the serial version has a reduction in the bandwidth of a channel for sending signals to the display screen which is directly proportional to the number of cells on the display screen occupied by picture element sources and receiving information to the total number of cells on the display screen.

In both versions for every display state period the information is extracted from a different area of memory than was the information for the previous display state period.

The parallel version differs from the serial in that it can achieve animation to a restricted extent. This animation can only take place in a direction orthogonal to that of the motion of the graphic. To achieve this animation a function can be incorporated in the character generator associated with a horizontal displacement on the screen.

The parallel version can also permit characters of restricted height to move in two different directions simultaneously across the screen.

The present invention thus consists in a display system to depict in motion graphics made up of elements arranged in dot matrix form by creating a series of stationary images in successive display state periods comprising:

(1) Means supporting an array of picture element sources, each picture element source having control means for causing it to display a visible signal on receipt of an electrical signal, the picture element sources being arranged over the area of the array on a matrix of rows and columns corresponding to the said dot matrix, in a manner such that every row, being a group of cells of the matrix arranged parallel to the direction of motion, contains picture element sources spaced apart throughout its length and such that every column, being a group of cells of the matrix arranged orthogonally to the direction of motion, has between zero and n picture element sources where n is equal to the number of rows in the matrix.

(2) Means for providing and transmitting said electrical signals to said control means, the signals being provided in sequential groups, each group being in respect of a display state period for the array, each signal in a group of signals transmitted to each said control means being encoded to represent an element of the dot matrix representing the momentarily stationary image associated with this display state period and that element corresponding in position to the picture element source to which said control means is connected, the sequence of said group of signals being such that in the next display state period an encoded signal will cause a given picture element source to display that element of the dot matrix in the same row as the one just displayed and adjacent to it in the direction opposite to that of the motion of the graphic, the number of picture element sources in the array being significantly lower than the number of elements in the said dot matrix such that if, while displaying a graphic having all the cells of its dot matrix occupied, a single display state period were sustained, then the momentarily stationary image would appear incomplete and unrecognizable, the sum of the durations of the display state periods necessary to display a signal representing an element of the graphic in dot matrix form at a picture element source in a given row of the array and to advance that signal to the next light in the same row and in the direction of motion not exceeding 250 milliseconds.

We claim:

1. A display system for depicting in motion at least one graphic made up of dot elements arranged in a matrix form of dot rows and at least two dot columns, said graphic being displayed by creating a series of stationary images in successive display state periods, with the graphic appearing to move across the display system as different stationary images are created, a dot row of the matrix being a group of cells of the matrix arranged parallel to the direction of apparent motion of the graphic, a dot column of the matrix being a group of cells of the matrix arranged orthogonally to the direction of apparent motion of the graphic, said series of stationary images advancing in the direction of apparent motion at the rate of one dot column per dislay state period, comprising:

an array of picture element sources, said picture element sources arranged in a stationary element matrix of element columns and element rows generally corresponding to the dot matrix such that every element row, being a group of cells arranged parallel to the direction of apparent motion of the graphic, contains picture element sources spaced apart throughout its length, and every element column, being a group of cells arranged orthogonally to the direction of apparent motion, has zero to n picture element sources wherein n is equal to the number of element rows in the element matrix, the number of picture element sources in said element matrix being less as compared to the number of dot elements in the graphic matrix such that if, while displaying a graphic having at least two adjacent dot columns of its matrix occupied, a single display state period is sustained, then the resulting momentarily stationary image appears incomplete and unrecognizeable, sampling means for sampling proportions of the graphic matrix at each display state period to produce signal means representing a fragment of the graphic matrix, said signal means cooperating with said picture element sources to illuminate each picture element source in a display state period to represent a dot element of the graphic matrix only when the position of a dot element in the fragment of the graphic matrix corresponds with the position of a picture element source, the series of stationary images being formed at such a rate that the sum of the durations of the display state periods from a given display of a dot element of the graphic matrix at a picture element source in a given element row of the element matrix until the next display of that dot element at the next picture element source in the same element row and in the direction of apparent motion is more than two display state periods and does not exceed 250 milliseconds.

2. A display system as claimed in claim 1 wherein the picture element sources are arranged in element columns which are spaced apart at equal intervals in the direction of motion by a distance on the array corresponding to not less than four and not more than twelve dot columns of a dot matrix of the graphic, there being not less than 7 picture element sources in each elements column.

3. Display system of claim 1 wherein each display state period is discrete and does not overlap a different display state period.

4. Display system of claim 1 wherein said picture element sources are simultaneously switched on at the start of a display state period to depict all congruent dot elements for a given stationary image and are simultaneously switched off by the end of said display state period.

5. Display system of claim 4 wherein each display state period is discrete and does not overlap a different display state period.

6. Display system of claim 5, wherin the picture element sources of said element columns are illuminated while displaying a given graphic in a given display state period, such that during the next display state period a given picture element source will display a dot element of the grahic in the same row as the dot element just displayed by that given picture element source and adjacent to it in a direction opposite to the motion of the graphic.

7. Display system of claim 5, wherein the picture element sources are arrayed in at least three spaced element columns, wherein the total number of element columns in an area of the picture element source array corresponding in width to a series of graphics is no more than 1/6 of the number of dot columns of the dot matrices of the series of graphics.

8. Display system of claim 5, wherein the number of illuminations of picture element sources in displaying a given graphic over a given display cycle is reduced compared to the number of dot elements in the graphic matrix at least in direct proportion to the reduction in the number of picture element sources in said element matrix as compared to the number of dot elements in the graphic matrix.

9. The display system of clam 5, wherein the time from switching on a given picture element source to the time the next picture element source in the same row and in the next column in the direction of motion of the graphic is switched on is a display cycle of no greater than 250 milliseconds in length and comprising a plurality of display state periods, wherein the display sequence at one column of the display system is repeated at the next column after the display cycle.

10. The display system of claim 5, wherein said system includes control means for causing said picture element sources to intensify upon receipt of electrical signals, said signals being provided in sequential groups, each group being in respect of a display state period of the system, wherein each signal is encoded to represent a dot element of the graphic matrix representing the momentarily stationary image associated with the display state period, said dot element corresponding in position to the picture element source which said signal causes to intensify.

11. Display system of claim 1, wherein said sampling means includes encoding means for converting a graphic matrix into a group of signals, each signal being in respect of a given dot element and each group of signals representing a display state period.

12. The display system of claim 5, wherein the dot elements are arranged in a graphic matrix form having x columns, and the array of picture element sources corresponding to said graphic matrix form has a total number of columns which is no more than x/6.

13. A method of controlling a display system for depicting in motion graphics made up of dot elements arranged in a graphic matrix form of dot rows and at least two dot columns by creating a series of stationary images in successive display state periods with the graphic appearing to move across the display system as different stationary images are created, said method comprising sampling proportions of the graphic matrix at each display state period to produce signals representing a fragment of the graphic matrix, and illuminating an array of picture element sources in the display system arranged in a stationary element matrix of element columns and element rows generally corresponding to the dot columns and dot rows, respectively, wherein every element row contains picture element sources spaced apart throughout its length, and every element column has from zero to n picture element sources, wherein n is equal to the number of element rows in the element matrix, the number of picture element sources in the element matrix being less than the number of dot elements in the graphic matrix, such that if, while displaying on said element matrix a graphic having at least two adjacent columns of its dot matrix occupied, a single display state period is sustained, then the resulting momentarily stationary image on said element matrix would appear incomplete and unrecognizeable as said graphic, wherein during the creation of the series of stationary images, a picture element source arranged in said element matrix is illuminated by said signals only when the position of a dot element of the graphic apparently travelling across the element matrix corresponds with the position of that picture element source, and all picture element sources depicting the congruent dot elements of a given stationary image are illuminated in a given display state period by being simultaneously switched on at the start of the display state period and being simultaneously switched off by the end of that display state period, with the series of stationary images being formed at such a rate that the sum of the durations of the display state periods necessary to display a signal representing a dot element of the graphic matrix at a given picture element source in a given element row of the element matrix and until the next display of that dot element at the next picture element source in the same element row, and in the direction of apparent motion, being more than two display state periods.

14. A display system as claimed in claim 5 wherein the sampling means for providing and transmitting said signals to said display systems includes means to provide an electrical input corresponding to a graphic to be displayed to character generator means comprising interconnected digital processing devices including at least one memory, constructed and arranged to convert said input into a dot matrix format suitable for presentation to the array, and to divide the converted input into said groups of signals, each group of signals giving rise to a display state representing a fragment of the graphic, said fragment being a different and independent section of the graphic from that represented by the preceding group of signals and said each group of signals being extracted from a different area of memory from the preceding group of signals.

15. Method of claim 13, wherein each group of signals representing a fragment of the graphic matrix cause picture element sources to simultaneously switch on at the start of a display state period to depict all congruent dot elements, and simultaneously switch off by the end of said display state period.

16. Method of claim 13, wherein each display state period is discrete and does not overlap a different display state period.

17. Method of claim 16, wherein the number of illuminations of picture element sources in displaying a given graphic over a given display cycle is reduced compared to the number of dot elements in the graphic matrix at least in direct proportion to the reduction in the number of picture element sources in the element matrix as compared to the number of dot elements in the graphic matrix.

18. Method of claim 17, wherein the time from switching on a given picture element source to illuminate same to the time the next picture element source in the same row and in the next column in the direction of motion of the graphic is switched on to illuminate same is a display cycle of no greater than 250 milliseconds in length and comprises a plurality of display state periods.

19. Method of claim 18, wherein the display sequence at one column of the display system is repeated at the next column after the display cycle.

20. In a display system for depicting in motion graphics made up of dot elements arranged in a graphic matrix form by creating a series of stationary images in successive display state periods, with the graphic appearing to move across the display system as different stationary images are created, including means for forming images by illuminating a stationary array of picture element sources arranged in a matrix of columns and rows corresponding to the graphic matrix, wherein the rows are groups of cells of the matrix arranged parallel to the direction of motion, and the columns are groups of cells arranged orthogonally to the direction of motion, the improvement comprising said array of picture element sources being of at least three element columns, wherein the total number of element columns in an area corresponding in width to a series of graphics is no more than 1/6 of the number of columns of the dot matrices of the series of graphics, and said display system include sampling means for sampling proportions of the graphic matrix at each display state period to produce signal means representing a fragment of the graphic matrix, said signal means cooperating with said picture element sources to illuminate each picture element source in a display state period to represent a dot element of the graphic matrix only when the position of a dot element in the fragment of the graphic matrix corresponds with the position of a picture element source, with the lesser number of said picture element sources in said array, as compared to the number of dot elements in the graphic matrix, being such that if, while displaying the graphic "B," a single display state period is sustained, then the resulting momentarily stationary image would be incomplete and unrecognizeable as the graphic "B," the picture elment sources of said element columns being illuminated such that during the next display state period a given picture element source will display a dot element of the matrix of a given graphic in the same row as the one just displayed and adjacent to it in a direction opposite to the motion of the graphic, the series of stationary images being formed at such a rate that the sum of the durations of the display state periods necessary to display a signal representing a dot element of a graphic matrix at the picture element source in a given row of the element array, and to advance the signal to the next picture element source in the same row and in the direction of motion, does not exceed 250 milliseconds.

* * * * *